United States Patent Office 2,839,472
Patented June 17, 1958

2,839,472
NON-AQUEOUS ELECTRO-CONDUCTIVE ELECTROLYTE

Michael Nevalonny, Farmingdale, N. J.

No Drawing. Application August 31, 1955
Serial No. 531,821

5 Claims. (Cl. 252—62.2)

This invention relates to non-aqueous electro-conducting electrolytes, and particularly to electrolytes which are suitable for use in electrical instruments, in which an electrical current is to be conducted through the electrolyte.

In many sensitive measuring and control instruments, the amount of power developed to be available to operate the instrument may be relatively small. Any friction that is present may absorb a substantial part of the normal force or torque that would be otherwise available to operate the instrument. Consequently, the sensitivity of the instrument is impaired.

In one type of instrument, for example, a potentiometer, for taking off an electric current throughout an entire range of movement, the use of sliding frictional contacts introduces so much friction as to render the operation of such an instrument unsatisfactory for many applications.

Moreover, with the progressive miniaturization of various instruments and motor-operated devices, the problem of providing a current-transfer device or a current-transfer medium has become aggravated.

A particular application, for example, is in supplying electrical current to an electric motor which drives a gyro wheel at relatively high speed as the operating element of a floated gyroscope. For proper operation of the gyroscope, the gyro wheel is enclosed in a hermetically sealed casing which is supported between bearings and is neutrally floated in the electrolyte for rotation about a precession axis. By such flotation of the casing the electrolyte serves mechanically to reduce the friction on the bearings for the casing. The electrolyte also serves electrically to conduct current to suitable insulated electrodes on the casing wall for delivery to the gyro wheel motor.

The use of the electrolyte permits such operating current to be supplied to the windings of the gyro motor without brushes, and obviates the frictional restraint on the casing that brushes would impose. Thus, friction is reduced to a minimum.

The electrolyte is non-aqueous and comprises, generally, as ionizing ingredient, a conducting medium for the ions, and a viscosity controlling medium that reduces and controls the surface tension of the conducting medium to vary the resistance to the ions.

As examples of several modifications of the electrolyte employed for this purpose, the following are given:

SOLUTION NO. 1 a. Constituents:
   10 g. sodium boroformate
   30 g. boric acid
   7 mg. curcumine
   2.5 g. potassium acetate
   1000 cc. trietheylene glycol
   20 cc. triethanol amine b. Properties:
   Viscosity at 26° C., 45 to 50 centipoises
   Resistivity at 70° C., 9,500 to 10,000 ohm-cm.

The resistivity of this solution is adjusted by adding more or less triethylene glycol.

SOLUTION NO. 2 a. Constituents:
   380 cc. polyglycol 2000
   170 cc. tetrahydrofurfuryl alcohol
   150 cc. propylene glycol
   14.8 g. boric acid
   7.4 g. sodium boroformate b. Properties:
   Viscosity at 26° C., 80–85 centipoises
   Resistivity at 70° C., 14,000 ohm-cm. approx.

The ingredient identified as polyglycol 2000 is a polymerized propylene glycol with an average molecular weight of 2000. The glycol is made and sold by Dow Chemical Company.

In this solution the resistivity may be adjusted by adding more or less salts.

SOLUTION NO. 3 a. Constituents:
   400 cc. polyglycol 2000
   150 cc. polyglycol 400
   100 cc. propylene glycol
   80 cc. ionizer, where the ionizer consists of—
      100 cc. propylene glycol
      100 cc. polyglycol 400
      20 g. boric acid
      10 g. sodium boroformate b. Properties:
   Viscosity at 26° C., 185 centipoises
   Resistivity at 70° C., 33,000 ohm-cm.

In this fluid the polyglycol 400 is also a polymerized propylene glycol sold by Dow Chemical Company and made to have an average molecular weight of 400.

Here, the higher ratio of polyglycol to solvents is utilized to increase the viscosity of the solution. This solution has been used in an angular accelerometer where the increased viscosity is desirable for damping operation. The less viscous fluid of solution No. 2 has been used for gyros and linear accelerometers.

SOLUTION NO. 4 a. Constituents:
   1090 cc. polyglycol 400
   820 cc. polyglycol 1200
   1090 cc. propylene glycol
   27.5 g. boric acid
   13.75 g. sodium boroformate b. Properties:
   Viscosity at 26° C., 85–95 centipoises
   Resistivity at 70° C., 14,500 ohm-cm.

The polyglycols are the polymerized propylene glycol with an average molecular weight corresponding to the identifying numeral.

SOLUTION NO. 5 a. Constituents:
   2000 cc. dipropylene glycol
   10 g. boric acid
   5 g. sodium boroformate b. Properties:
   Viscosity at 26° C., 75 centipoises
   Resistivity at 70° C., 14,600 ohm-cm.

*Functions of the constituents* a. *Salts.*—The salts used in these fluids have been chosen because they are stable under electric current flow, and are non-corrosive to the instrument electrode metal. Most salts are changed by prolonged alternating-current flow, and they react with the electrode metal.

*b. Solvents.*—Water is not suitable as a solvent because it changes resistance with time, its freezing point is too high and its boiling point too low. A number of organic fluids have the characteristics necessary for use as a solvent in such electrolytes.

These fluids suitable for use as electrolytes are generally the alcohols and glycols and should have certain characteristics, as follows:

(1) The fluid must dissolve and ionize the salts chosen.

(2) The fluid must be an insulator, i. e., it must not itself ionize or it will change the properties of the electrolyte with age.

(3) The fluid must not react with or corrode the instrument parts.

(4) The melting point of the fluid should be relatively low, and its boiling point above 120° C., if possible.

(5) The graph of viscosity vs. temperature should have a slope as small as possible.

(6) The viscosity of the fluid must satisfy damping requirements in the instrument.

*c. Polyglycols.*—These are viscous constituents which are compatible with certain electrolytes and are added for the purpose of adjusting the viscosity to values required for proper damping of the instruments in which the fluids are used. These compounds are propylene glycol polymers sold by the Dow Chemical Company, Midland, Michigan. Slight progressive decomposition sets in when these fluids are held at 125° C. Electrolyte resistance changes as a result of this decomposition.

*d. Curcumine.*—This material is used as an indicator and depolarizer.

What is claimed is:

1. A non-aqueous bi-directionally electro-conductive electrolyte consisting essentially of:

10 g. sodium boroformate
30 g. boric acid
7 mg. curcumine
2.5 g. potassium acetate
1000 cc. triethylene glycol
20 cc. triethanol amine and having a viscosity of 45 to 50 centipoises at 26° C., and having a resistivity of 9,500 to 10,000 ohm-cm. at 26° C.

2. A non-aqueous bi-directionally electro-conductive electrolyte consisting essentially of:

380 cc. polymerized propylene glycol having an average molecular weight of 2000.
170 cc. tetrahydrofurfuryl alcohol
150 cc. propylene glycol
14.8 g. boric acid
7.4 g. sodium boroformate and having a viscosity of 80–85 centipoises at 26° C., and having a resistivity of 14,000 ohm-cm. approximately at 70° C.

3. A non-aqueous bi-directionally electro-conductive electrolyte consisting essentially of:

400 cc. polymerized propylene glycol having an average molecular weight of 2000
150 cc. polymerized propylene glycol having an average molecular weight of 400
100 cc. propylene glycol
80 cc. ionizer where the ionizer consists of:

100 cc. propylene glycol
100 cc. polymerized propylene glycol having an average molecular weight of 400
20 g. boric acid
10 g. sodium boroformate and having a viscosity of 185 centipoises at 26° C., and having a resistivity of 33,000 ohm-cm. at 70° C.

4. A non-aqueous bi-directionally electro-conductive electrolyte consisting essentially of:

1090 cc. polymerized propylene glycol having an average molecular weight of 400
820 cc. polymerized propylene glycol having an average molecular weight of 1200
1090 cc. propylene glycol
27.5 g. boric acid
13.75 g. sodium boroformate and having a viscosity of 85–95 centipoises at 26° C., and having a resistivity of 14,500 ohm-cm. at 70° C.

5. A non-aqueous bi-directionally electro-conductive electrolyte consisting essentially of:

2000 cc. dipropylene glycol
10 g. boric acid
5 g. sodium boroformate and having a viscosity of 75 centipoises at 26° C., and having a resistivity of 14,600 ohm-cm. at 70° C.

References Cited in the file of this patent

UNITED STATES PATENTS

| | | |
|---|---|---|
| 2,071,103 | Bergstein | Feb. 16, 1937 |
| 2,104,733 | Brennan | Jan. 11, 1938 |
| 2,253,507 | Clark | Aug. 26, 1941 |
| 2,668,225 | Livingstone | Feb. 2, 1954 |